Figure 1:
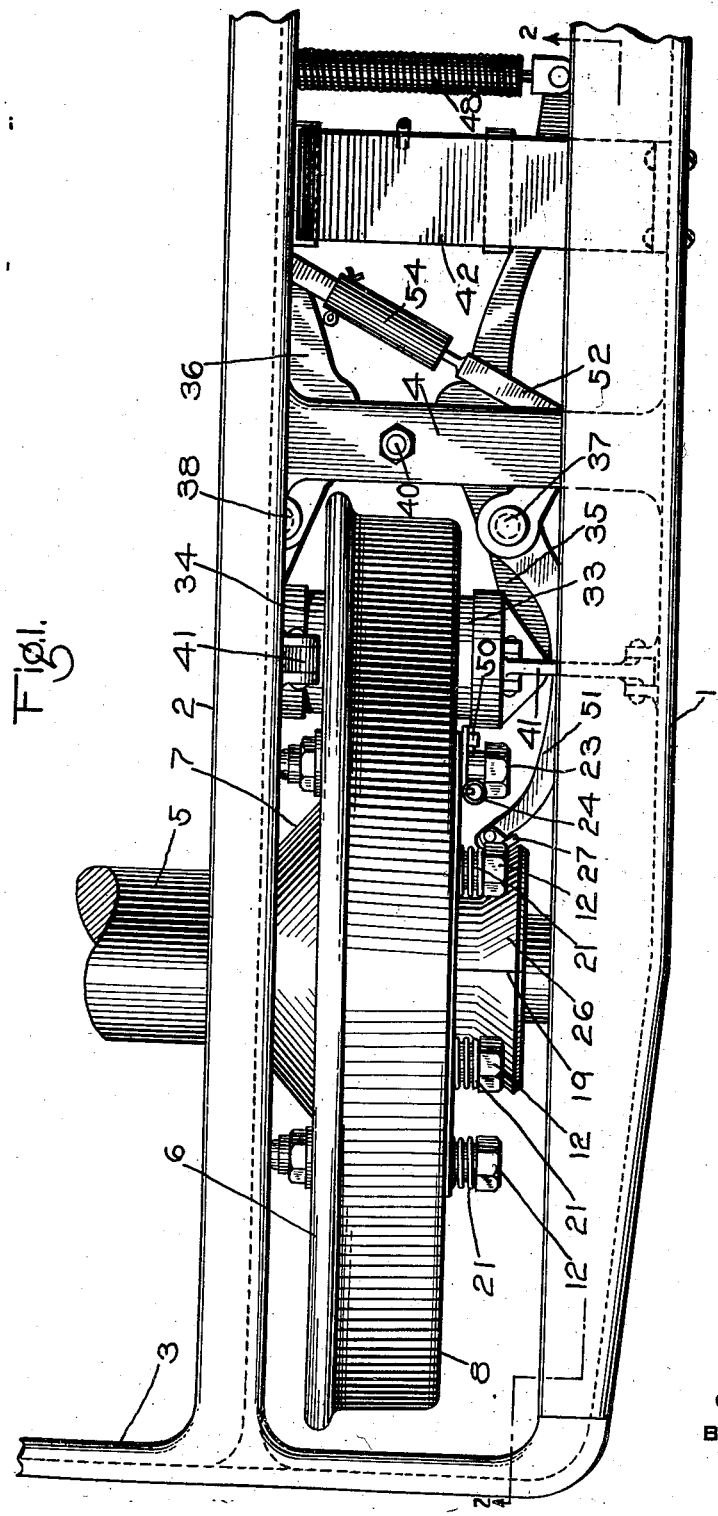

April 23, 1940.  C. C. FARMER  2,198,027
BRAKE VENTILATION CONTROL MEANS
Filed Dec. 17, 1938  3 Sheets-Sheet 1

INVENTOR
CLYDE C. FARMER
BY
ATTORNEY

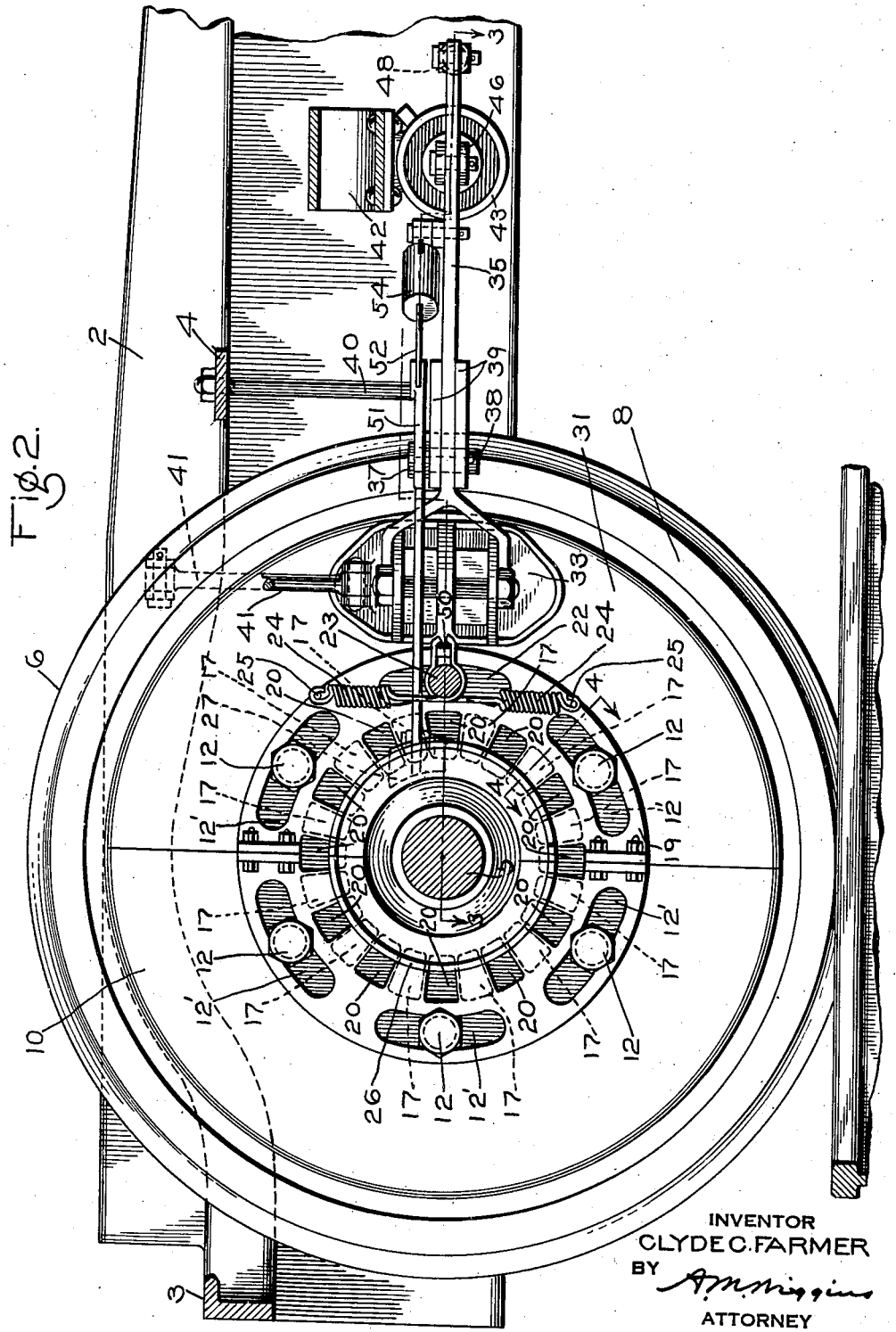

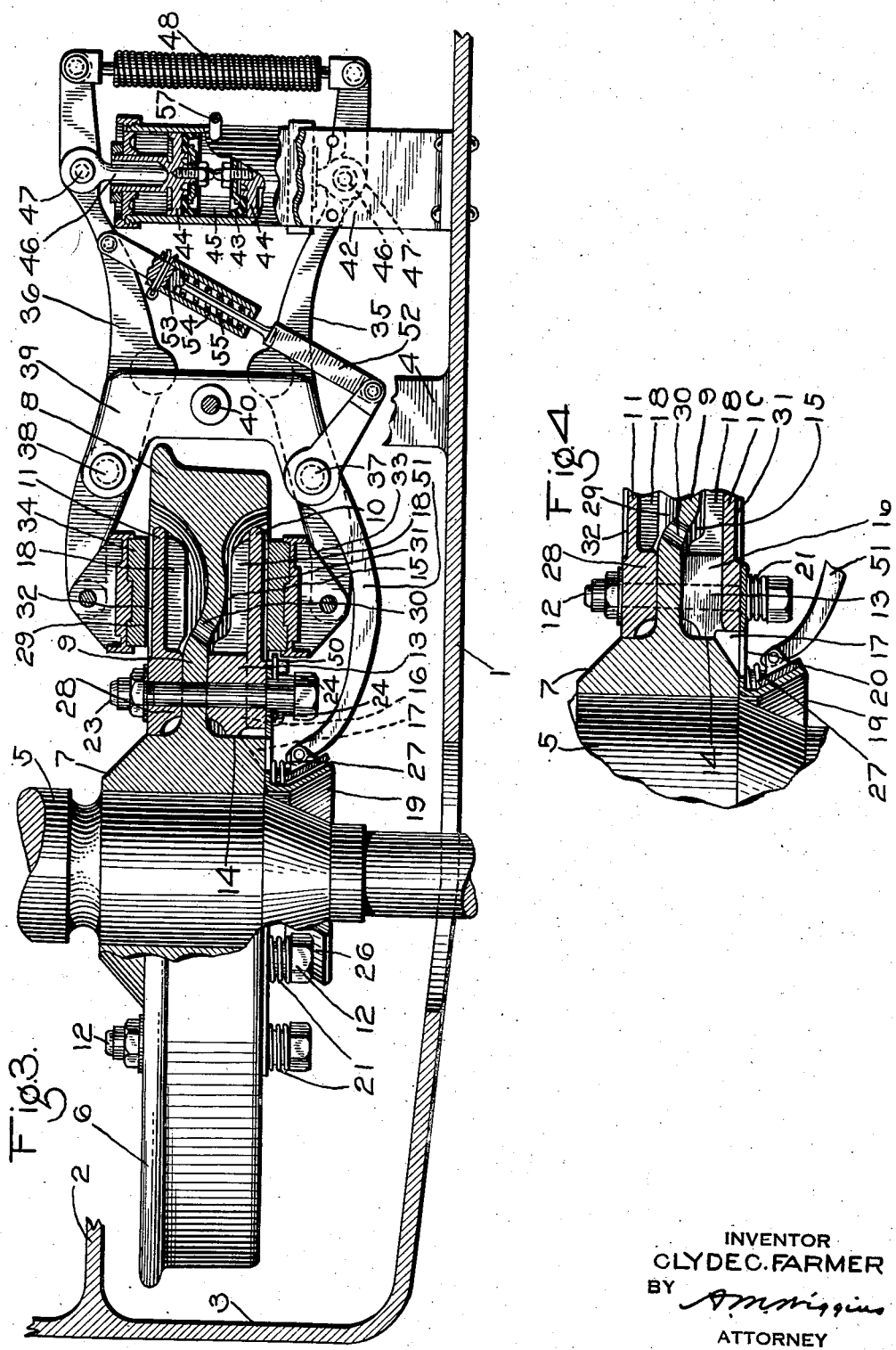

Patented Apr. 23, 1940

2,198,027

UNITED STATES PATENT OFFICE 2,198,027

BRAKE VENTILATION CONTROL MEANS

Clyde C. Farmer, Pittsburgh, Pa., assignor to The Westinghouse Air Brake Company, Wilmerding, Pa., a corporation of Pennsylvania Application December 17, 1938, Serial No. 246,388

18 Claims. (Cl. 188—264)

This invention relates to railway friction brake mechanism of the type having one or more rotatable friction brake elements which are associated with one or more wheel and axle assemblies of the vehicle for rotation therewith, one or more non-rotatable friction brake elements for frictional braking engagement with the rotatable brake element or elements, and an air circulating system having an air translating means associated with each rotatable element so as to rotate therewith to effect the circulation of air currents about and through the mechanism to dissipate heat from the friction elements.

It has been proposed to provide each wheel and axle assembly of modern high speed trains with one or more of the above mentioned type of brake mechanism. Heretofore one objection to such mechanisms has been that the means embodied therein which are driven by the wheel and axle assemblies for causing air currents to pass through or about the friction braking elements for dissipating heat from these and associated brake parts act to materially resist the motive power of the train, this being especially true when the train is traveling at high speed. When the train is traveling at high speed and the brakes are applied to reduce the speed of the train such resistance is beneficial in that it assists in braking the train, but when the brakes are in their release condition it becomes objectionable as above noted.

During braking it is important that the air circulating means function to effect the dissipation of heat from the several parts of the brake mechanism, but with the brakes released there will be no heating of these brake parts and consequently there is no need for the operation of the air circulating or cooling system, and so far as the cooling mechanism is concerned it can be rendered ineffective.

With the above mentioned conditions in mind the principal object of the invention is to provide a brake mechanism of the above mentioned type with means whereby the air circulating system may be automatically rendered ineffective when the brakes are fully released and thereby prevent the means from opposing the motive power of the train, and which will be automatically rendered effective in initiating an application of the brakes and which will remain effective until such time as the brakes are subsequently fully released.

This object is obtained by means of a control mechanism which comprises a movable cover or shutter which when the brake mechanism is in its release position covers the inlet communications or openings through which air may flow to the translating means and which, when an application of the brakes is initiated and during the brake application, is caused to assume a position with relation to the rotatable brake elements to uncover the inlet communications, and, which when the brakes are released is caused to assume its communication closing position.

Other objects and advantages will appear in the following more detailed description of the invention.

In the accompanying drawings, Fig. 1 is a fragmentary plan view of a railway vehicle truck embodying the invention; Fig. 2 is a vertical longitudinal sectional view taken on the line 2—2 of Fig. 1, portions of the truck frame being omitted; Fig. 3 is a horizontal longitudinal sectional view taken on the line 3—3 of Fig. 2; and Fig. 4 is a fragmentary sectional view taken on the line 4—4 of Fig. 2, showing the shutter in its duct opening position.

For illustrative purposes the invention is shown applied to a railway truck having a cast metal truck frame which is carried in the usual manner by two or more wheel and axle assemblies, only a portion of one of which assemblies is shown in the drawings.

Each side of the truck frame may comprise spaced inner and outer longitudinally extending wheel pieces 1 and 2, respectively, which are connected together at each end of the truck by transversely extending end pieces 3 and which are connected together intermediate their ends by means of short integral transversely extending bridge pieces 4, only one of such end and bridge pieces being shown.

Each wheel and axle assembly may comprise the usual axle 5 to each end of which is rigidly secured a vehicle wheel 6, each wheel extending into the space between the adjacent portions of the wheel pieces 3 and 4 of the truck frame.

The brake mechanism may be identical for each vehicle wheel, and each mechanism will operate as a unit with respect to the other mechanisms, and in view of this, the following description will, for the purpose of simplification, be more or less limited to one wheel of a single wheel and axle assembly and the adjacent or associated parts of the truck frame.

The wheel 6 may as shown comprise a hub 7, a tread and flange portion 8 and a web 9 which integrally connects the hub 7 and portion 8 together.

The wheel is provided with two annular friction brake elements, 10 and 11, which are arranged on opposite sides of the web 9 and which are clamped to the web by means of radially arranged lateral bolts 12 so as to rotate with the wheel. The element 10 being hereinafter called the outer element and the element 11 the inner element. These outer and inner elements 10 and 11, respectively, may be made in the form of a single integral annulus but, for the purpose of facilitating their removal and replacement without interference by the wheel of the assembly, are each preferably made of two segmental pieces which, when clamped to the wheel, are in end to end abutment with each other as shown in Fig. 2.

The outer element 10, at its inner edge, is provided with a plurality of spaced radially arranged inwardly extending lugs 13 having their inner faces clamped against one side of the web 9 of the wheel by means of the bolts 12 which pass through suitable openings in the lugs, the inner edges of the lugs engaging an annular shoulder 14 formed on the hub 7 of the wheel. The width of the element 10 is such that there will be an unobstructed space between the outer edge thereof and the adjacent inner surface of the tread portion 8 of the wheel.

The lugs 13 are of considerably less width than the element so that the element for the remainder of its width is spaced away from the web 9 of the wheel. The inner surface of this remaining portion and the outer surface of the web of the wheel define an air chamber 15 which is open to the atmosphere by way of the space between the outer edge of the element and the portion 8 of the wheel. This chamber 15 is open to inlet air ducts 16 which are defined by the lugs 13, the element and web 9 of the wheel, and these air ducts 16 register with inlet air ducts 17 which are provided in the outer end of the hub 7 of the wheel.

Carried by the outer element 10 and extending into the chamber 15 are spaced radially arranged fins 18 which extend in directions across the element from the lugs 13 to a point near the outer edge of the element. These fins are adapted to serve as fan blades to draw air through the inlet ducts 16 and 17 into the chamber 15 and to force the air from the chamber to the atmosphere by way of the space between the outer edge of the element and the portion 8 of the wheel.

Slidably contacting a portion of the outer face of the outer element 10 is an annular shutter member 19 which is mounted on the bolts 12, there being arcuate slots 12' provided in the member to accommodate the bolts to permit limited relative rotation between the member and wheel, as will hereinafter more fully appear. This member is provided with a plurality of radially arranged openings 20 which are substantially the same shape and dimensions as the outer open end of the duct 17 and are also spaced apart the same distance, the member being normally positioned so that the openings will be out of registration with the ducts 17 as shown in Figs. 2 and 3. When, as will be hereinafter more fully described, the member is in stop engagement with either side of the bolts 12, the openings 20 will be in substantial registration with the ducts 17.

The shutter member 19 may be made in the form of a single piece but, as shown in the drawings, is preferably made of two segmental pieces which are secured together in end to end relation by means of bolts as shown or any other suitable means. This construction is employed to facilitate assembly or replacement of the member without interference by the wheel of the assembly.

Interposed between and engaging the inner surface of the head of each bolt 12 and the outer surface of the shutter member 19 is a coil spring 21 which, at all times, acts to maintain the member in close contact with both the hub 7 of the wheel and the member.

Extending through an arcuate slot 22 and through registering openings in elements 10 and 11 is a laterally extending bolt 23 which may be identical with each bolt 12 and which serves in the same manner to secure the elements 10 and 11 to the web 9 of the wheel. Located at each of the two opposite sides of the bolt 23 is a spring 24 having its outer end attached to a lug 25 which extends outwardly at right angles from the member 19 and which may be welded or otherwise secured to the member adjacent its periphery. The inner end of the spring passes across the bolt and is hooked into engagement with one side of the bolt. It will here be noted that the hooked ends of the springs 24 engage diametrically opposite sides of the bolt, so that no matter in which direction the member 19 rotates with relation to the bolt, it will be automatically returned to its normal duct closing position by one or the other of the springs as the case may be. It should here be mentioned that the value of each spring 24 is such that it is capable of rotating the member 19 against the resistance set up by the frictional interengagement between the member and element under the influence of the pressures of the springs 21.

Encircling the axle 5 is a flange or drum 26 which, as shown in the drawings, is preferably integral with the member 19 and which extends outwardly from the member at an acute angle, the inner surface of the drum constituting a friction face which is adapted to be engaged by a friction shoe 27 hereinafter more fully described.

The inner brake element 11 is quite similar in form to the outer element 10, the only material difference being that the member 11 is provided with a single annular clamping lug 28 instead of the spaced lugs 13 of the member 10. From this it will be seen that an air chamber 29 which is defined by the member 11 and the inner surface of the web 9 of the wheel is closed at its inner edge to the atmosphere, the flow of cooling air to this chamber being by way of chamber 15 and a series of spaced openings 30 in the web of the wheel, the flow of air through these openings 30 and chamber 29 being induced by the action of the fins 18 of the member 11.

Outwardly beyond the edge of the member 19 the outer element 10 is provided with an outer friction face 31, the inner element 11 being provided with a similar face 32. These surfaces are adapted to be frictionally engaged by brake shoes 33 and 34, respectively, which are adapted to be actuated by a mechanism which may be of the pincer type comprising a pair of laterally spaced outer and inner levers 35 and 36, respectively, which extend in a direction longitudinally of the truck frame, and which are pivotally connected, intermediate their ends, by pins 37 and 38, respectively, to the opposite ends of laterally extending tension members 39 which are supported by a vertical bolt 40 secured to the bridge piece 4 of the truck frame.

One end of the lever 35 is operatively connected to the brake shoe 33 and the corresponding end of the lever 36 is operatively connected to the brake shoe 34, each of the brake shoes and consequently the connected end of the associated lever being supported from the truck frame by means of a pivoted hanger 41.

Interposed between the opposite ends of the levers and rigidly secured to a transversely extending bracket 42 secured to the wheel pieces 1 is a brake cylinder casing 43 in which there is operatively mounted a pair of oppositely movable pistons 44 having a chamber 45 between their pressure faces into which chamber fluid under pressure is supplied to effect an application of the brakes and from which fluid under pressure is released to effect the release of the brakes. One of the pistons 44 is provided with a push rod 46 which at its outer end is cooperatively connected to the lever 35 by means of a pin 47. The other piston 44 is provided with a like push rod which is similarly connected at its outer end to the lever 36.

Interposed between and operatively connected to the extreme outer ends of the levers 35 and 36 is a release spring 48 which, as shown in the drawings, normally maintains the levers, brake cylinder pistons and brake shoes in their release position. It should here be mentioned that the shutter closing springs 24, hereinbefore referred to, are both initially tensioned so as to pull on the member 19 and bolt 23 to thereby maintain the member 19 in its duct closing position. In the event of one of the springs becoming weaker than the other or of one spring being originally weaker, the more powerful spring would ordinarily cause the shutter member 19 to unintentionally move beyond its proper duct closing position and therefore slightly uncover the duct 17 to the atmosphere so that the fins 18 acting to circulate air through the mechanism would opposite rotation of the wheel and axle assembly. To prevent such unintentional movement, the member 19 is provided with a stop lug 50 which is located outwardly beyond the bolt 23 and which extends between and engages the extreme end of the hooked portions of the springs. It will be noted that when the member is in its proper duct closing position if one spring has greater force than the other the lug will engage the hooked end of the more powerful spring and due to such engagement the spring can no longer act to move the member and as a consequence the member cannot be moved beyond its proper position.

For the purpose of actuating the shoe 27 into and out of frictional engagement with the friction face of the drum 26, a lever 51 is provided which is pivotally mounted intermediate its ends on the pin 37 which operatively connects the lever 35 to the tension members 39. One end of this lever 51 is operatively connected to the shoe 27 and the other end is operatively connected to the lever 36 through the medium of a resilient rod construction comprising a link 52 having one end connected to the lever 35 and having at the other end a head 53 which is slidably mounted in the hollow end portion of a link 54 which is operatively connected at its other end to the lever 36 at a point located between the pin 38 and the brake cylinder push rod connection with the lever 36. Interposed between and engaging the inner surface of the head 53 and the inner surface of the outer end of the hollow portion of the link 54 is a spring 55, which spring forms a yieldable connection between the links which is adapted to prevent the full force of the lever 36 from being transmitted to the friction shoe 27, as will be hereinafter more fully described.

*Operation of the mechanism*

Assuming the wheel 6 to be rotating and it is desired to brake it, fluid under pressure is admitted to the piston chamber 45 of the brake cylinder by way of a conduit 57. This causes the brake cylinder pistons 44 and thereby the push rods 46 and the respective ends of the levers 35 and 36 to move outwardly away from each other against the opposing action of the release spring 48.

The levers 35 and 36 as they are thus actuated rock about their respective pins 37 and 38 and move the brake shoes 33 and 34 toward each other into frictional braking engagement with the friction braking faces of the outer and inner brake elements 10 and 11, respectively.

The lever 36 as it thus moves acts through the link 54, spring 55 and link 52 to rock the lever 51 about the pin 37 in a counterclockwise direction, thereby causing the friction shoe 27 to frictionally engage the friction face of the drum 26, such engagement occurring before the brake shoes are brought into frictional braking engagement with the rotating brake elements 10 and 11. It will here be noted that after the shoe 27 is in engagement with the drum 26, the continued movement of the lever 36 to bring the associated brake shoe 34 into braking engagement with the inner brake element 11 will cause the link 54 to move relative to the link 52, the spring 55 yielding to such movement and thereby limiting the force transmitted to the shoe 27.

The shoe 27 when it thus engages the drum 26 retards the rotary motion of the shutter member 19 as a whole, so that the outer element 10, which is now rotating at a faster rate of speed than the member, brings the ducts 17 into registration with the openings 20 in the member. At substantially the same time as this registration occurs, the bolts 12 which move with the element relative to the member, engage the member at one or the other ends of the arcuate slot depending upon the direction of rotation of the element.

When this relative movement between the element and member 19 occurs, the bolt 23, which moves with the element, causes one of the springs 24 to be stretched. The other spring 24 will be inactive but will be maintained tensioned by reason of the engagement of the stop lug 50 of the member with the hooked end of the spring, thus this inactive spring will be maintained against chattering.

The member 19, since the bolts 12 are in driving engagement therewith, will now rotate at the same rate of speed as that of the outer element 10. The shoe 27 remains in frictional engagement with the drum 26 as long as the brakes are applied and as a result the stretched spring 24 is not permitted to return the member 19 to its duct closing position.

With the openings 20 of the member 19 in registration with the ducts 17 in the hub 7 of the wheel, air flows from these ducts and the registering ducts 16 to the chamber 15 and is discharged from the chamber to the atmosphere by means of the fins 18 of the outer brake element 10, the flow of air from the chamber being by way of the space between the periphery of the element and the adjacent surface of the tread portion of the wheel.

Air flows from the chamber 15 through the openings 30 of the web 9 of the wheel to the chamber 29 at the other side of the wheel where it is forced outwardly to the atmosphere by the fins 18 of the brake element 11.

It will thus be seen that when an application of the brakes is being effected, air will circulate past the backs of the brake elements 10 and 11 and carry the heat therefrom to the atmosphere, thereby preventing excessive heating of the friction elements of the mechanism.

When it is desired to effect the full release of the brakes, fluid under pressure is completely vented from the brake cylinder piston chamber 45 by way of the conduit 57, whereupon the release spring 48 acts to move the levers 35 and 36 and brake cylinder pistons 44 to their normal release position, the levers acting to move the brake shoes 33 and 34 out of frictional engagement with the respective brake elements 10 and 11. At substantially the same time as the brake shoes are moved out of engagement with the brake elements, the lever 36 acts through the medium of the link 54, spring 55 and link 52 to rock the lever 51 about the pin 37 in a clockwise direction to move the shoe 27 out of frictional engagement with the drum 26. When the shoe 27 has thus been moved, the spring 24 which has been stretched during the braking operation, acts to rotate the shutter member 19 relative to the outer element 10 back to its original or normal position, the stop lug 50 preventing movement of the member beyond this position in case the actuating spring should be more powerful than the inactive spring. The shutter member 19 in this position covers the ducts 17, so that air can no longer flow therethrough to chambers 15 and 29 and due to this the fins 18 of the brake elements 10 and 11 will be relieved of the work of circulating air through the mechanism and therefore will be effectively prevented from opposing rotary movement of the wheel and axle assembly.

While one illustrative embodiment of the invention has been described in detail, it is not the intention to limit its scope to that embodiment or otherwise than by the terms of the appended claims.

Having now described my invention, what I claim as new and desire to secure by Letters Patent, is:

1. In a brake mechanism for a rotatable member, rotatable and non-rotatable brake elements adapted to frictionally engage with each other for braking said rotatable member, means operative for effecting the frictional braking engagement of said brake elements with each other and also operative for effecting the disengagement of the brake elements, an air circulating system associated with said rotatable brake element for dissipating heat from the brake mechanism, and means normally rotatable with said member and rendering said air circulating system ineffective and operative relative to the member to render the air circulating system effective upon the operation of the first mentioned means to effect the frictional braking engagement of said brake elements with each other.

2. In a brake mechanism for a rotatable member, rotatable and non-rotatable brake elements adapted to frictionally engage with each other for braking said rotatable member, means operative for effecting the frictional braking engagement of said brake elements with each other and also operative for effecting disengagement of the brake element, an air circulating system associated with said rotatable brake element adapted to dissipate heat from the brake mechanism, said air circulating system being effective while the brake elements are in braking engagement with each other and being ineffective when the brake elements are out of engagement with each other, means carried by said rotatable member and movable relative to the rotatable member for automatically controlling the air circulating system.

3. In a brake mechanism for a rotatable member, rotatable and non-rotatable brake elements adapted to frictionally engage with each other for braking said rotatable member, means operative for effecting the frictional braking engagement of said braking elements with each other and also operative for effecting the disengagement of the brake elements, an air circulating system associated with said rotatable brake element adapted to dissipate heat from the brake mechanism, control means carried by the rotatable brake element to provide for relative rotary movement between the means and element and adapted upon rotary movement of the rotatable brake element relative thereto for rendering the air circulating system effective, restraining means operative to oppose rotary motion of said control means with the rotatable brake element so that the rotatable brake element will rotate relative to the control means, said control means being adapted upon rotary movement thereof relative to the rotatable brake element to render the air circulating system ineffective, and means for rotating said control means relative to said rotatable brake element upon the operation of said restraining means from its motion opposing position.

4. In a brake mechanism for a rotatable member, rotatable and non-rotatable brake elements adapted to frictionally engage with each other for braking said rotatable member, means operative for effecting the frictional braking engagement of said brake elements with each other and also operative for effecting the disengagement of the brake elements, an air circulating system associated with said rotatable brake element for dissipating heat from the brake mechanism, said system comprising a chamber open to the atmosphere, an air inlet duct leading to said chamber, means carried by said rotatable brake element for drawing air through said duct to said chamber and for expelling the air from said chamber to the atmosphere, and control means normally preventing the flow of air through said duct to said chamber and adapted upon rotary movement of the rotatable brake element relative thereto to permit the flow of air to said chamber, and means operative upon the operation of the first mentioned means for restraining the movement of the control means so that the rotary brake element will rotate relative thereto.

5. In a brake mechanism for a wheel and axle assembly of a railway vehicle truck, a brake element rotatable with said wheel and axle assembly, a non-rotatable brake element carried by the frame of said truck and movable into and out of frictional braking engagement with the rotatable brake elements, means for actuating the non-rotatable brake element, an air circulating system associated with the rotatable brake element for effecting the dissipation of heat from the mechanism, control means carried by said rotatable element and having a lost motion connection therewith to permit relative movement between the elements and the control means between two positions for rendering the said air circulating system effective or ineffective, and means operative to control the relative movement between the rotatable brake elements and control means.

6. In a brake mechanism for wheel and axle assembly of a railway vehicle truck, a brake element rotatable with said wheel and axle assembly, a non-rotatable brake element carried by the frame of said truck and movable into and out of frictional braking engagement with the rotatable brake element, means for actuating the non-rotatable brake element, an air circulating system associated with the rotatable brake elements for effecting the dissipation of heat from the mechanism, control means carried by said rotatable brake element and having a lost motion connection therewith to permit relative movement between the element and means between two positions rendering said air circulating system effective or ineffective, and means operative into and out of engagement with control means for controlling the relative movement between the rotatable brake element and control means.

7. In a brake mechanism for a wheel and axle assembly of a railway vehicle truck, a brake element rotatable with said wheel and axle assembly, a non-rotatable brake element carried by the frame of said truck and movable into and out of frictional braking engagement with the rotatable brake element, means for actuating the non-rotatable brake element, air circulating means associated with the rotatable brake element for effecting the dissipation of heat from the mechanism, control means carried by said rotatable brake element and having a lost motion connection therewith to permit relative movement between the elements and means between the two positions for rendering said air circulating means effective or ineffective, and means operative into engagement with control means for effecting relative movement between the rotatable brake element and control means to render the air circulating means effective and operative out of engagement with said control means for effecting relative movement between the rotatable brake element and control means to render the air circulating means ineffective.

8. In a brake mechanism for a wheel and axle assembly of a railway vehicle truck, a brake element rotatable with said wheel and axle assembly, a non-rotatable brake element carried by the frame of said truck and being movable into and out of frictional braking engagement with a rotatable brake element, means actuating the non-rotatable brake element, an air circulating system associated with the rotatable brake element for effecting the dissipation of heat from the mechanism, and control means carried by said rotatable brake element automatically operative relative thereto for cutting the air circulating system into and out of effective action.

9. In a brake mechanism for a wheel and axle assembly of a railway vehicle truck, a brake element rotatable with said wheel and axle assembly, a non-rotatable brake element carried by the frame of said truck and movable into and out of frictional braking engagement with the rotatable brake element, means for actuating the non-rotatable brake element, an air circulating system associated with the rotatable brake element for effecting the dissipation of heat from the mechanism, control means movably carried by said rotatable brake element having a position with respect to the rotatable brake element for rendering the air circulating system ineffective and having a different position with respect to the rotatable brake element for rendering the air circulating system effective, and means automatically operative to effect the positioning of the control means.

10. In a brake mechanism for a wheel and axle assembly of a railway vehicle truck, a brake element rotatable with said wheel and axle assembly, a non-rotatable brake element carried by the frame of said truck and movable into and out of frictional braking engagement with the rotatable brake element, means for actuating the non-rotatable brake element, an air circulating system associated with the rotatable brake element for effecting the dissipation of heat from the mechanism, control means movably carried by said rotatable brake element having a position with respect to the rotatable brake element for rendering the air circulating system ineffective and having a different position with respect to the rotatable brake elements for rendering the air circulating system effective, and means automatically operative upon the initial braking movement of the non-rotatable brake element for effecting the positioning of said control means to render the air circulating system effective and automatically operative upon the subsequent disengagement of said brake element for effecting the positioning of control means to render the circulating system ineffective.

11. In a brake mechanism, in combination, a rotatable member to be braked, a brake element movable into frictional braking engagement with said rotatable member, an air circulating system for maintaining the mechanism cool, and means carried by the rotatable brake element and operative relative thereto for rendering the air circulating system ineffective for cooling while the non-rotatable brake element is out of braking engagement with the rotatable member and being operative upon movement of the non-rotatable brake element to engage the rotatable member for rendering the air circulating system effective.

12. In a brake mechanism, in combination, a rotatable member to be braked, a brake element movable into frictional braking engagement with said rotatable member, an air circulating system embodied in said rotatable member and operative to maintain the mechanism cooled, means carried by the rotatable member rendering the air circulating system ineffective when said element is out of braking engagement with said member and being operative upon movement of the element to engage the member for rendering the air circulating system effective.

13. In a brake mechanism, in combination, a rotatable member to be braked, a brake element movable into and out of frictional braking engagement with said rotatable member, an air circulating system for maintaining the mechanism cool, and means carried by said rotatable member operative relative to the rotatable member upon the initial movement of the non-rotatable brake element to brake the rotatable member for cutting the air circulating system into operation and operative upon movement of the non-rotatable brake element out of engagement of the rotatable member for cutting the air circulating system out of operation.

14. In a brake mechanism, in combination, a rotatable member to be braked, a brake element movable into and out of frictional braking engagement with said rotatable member, an air circulating system embodied in said rotatable member and operative for maintaining mechanism cool, and means carried by the rotatable member and operative relative thereto upon the initial movement of the brake element to brake the member for cutting the air circulating system into operation and operative upon movement of the element out of engagement with the member for cutting the air circulating system out of operation.

15. In a brake mechanism for a wheel of a railway vehicle, in combination, an annular brake element carried by said wheel for rotation therewith, said element and the web of the wheel defining an air chamber which is open to the atmosphere at the periphery of the element, a non-rotatable brake element movable into frictional braking engagement with said annular brake element, means for actuating said non-rotatable brake element, an air inlet duct leading to said chamber, means carried by said annular brake element adapted to draw air through said duct to said chamber and to expel the air from the chamber to the atmosphere, and shutter means normally closing said inlet duct and being automatically operative upon effecting the braking movement of the non-rotatable brake element for uncovering the inlet duct.

16. In a brake mechanism for a wheel of a railway vehicle, in combination, an annular brake element carried by said wheel for rotation therewith, said element and the web of the wheel defining an air chamber which is open to the atmosphere at the periphery of the element, a non-rotatable brake element movable into frictional braking engagement with said annular brake element, means for actuating said non-rotatable brake element, an air inlet duct leading to said chamber, means carried by said annular brake element adapted to draw air through said duct to said chamber and to expel the air from the chamber to the atmosphere, shutter means normally closing said inlet duct and being automatically operative upon effecting the braking movement of the non-rotatable brake element for uncovering the inlet duct, and means operative upon the subsequent movement of the non-rotatable brake element out of braking engagement with the annular brake element for effecting the operation of said shutter means to close said inlet duct.

17. In a brake mechanism for a wheel of a railway vehicle, in combination, an annular brake element carried by said wheel for rotation therewith, said element and the web of the wheel defining an air chamber which is open to the atmosphere at the periphery of the element, a non-rotatable brake element movable into frictional braking engagement with said annular brake element, means for actuating said non-rotatable brake element, an air inlet duct leading to said chamber, means carried by said annular brake element and projecting into said chamber adapted to draw air through said duct to said chamber and to expel the air from the chamber to the atmosphere, and shutter means normally closing said inlet duct and being automatically operative upon effecting the braking movement of the non-rotatable brake element for uncovering the inlet duct.

18. In a brake mechanism for a wheel of a railway vehicle, in combination, two annular brake elements arranged one on each side of the web of said wheel and secured for rotation with the wheel, non-rotatable brake elements movable into frictional braking engagement with said annular brake elements, each of said annular brake elements and the respective side of said web defining an air chamber which is in communication with the atmosphere at the periphery of the element, an air inlet duct opening into the air chamber at one side of the web, an air inlet opening in said web leading from said air chamber to the air chamber at the other side of said web, air translating means operative by said annular brake elements for expelling air from said air chambers, and shutter means normally covering said duct to prevent the flow of air therethrough to said chambers, said shutter means being operative to uncover said ducts upon effecting the braking movement of said non-rotatable brake elements.

CLYDE C. FARMER.